United States Patent
Kostrykin et al.

(10) Patent No.: US 12,450,758 B2
(45) Date of Patent: Oct. 21, 2025

(54) METHOD AND DEVICE FOR MONITORING THE STATE OF A COMPONENT

(71) Applicant: Siemens Energy Global GmbH & Co. KG, Bayern (DE)

(72) Inventors: Leonid Kostrykin, Heidelberg (DE); Claus Rohr, Schwetzingen (DE); Karl Rohr, Hambrücken (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 12 days.

(21) Appl. No.: 18/682,922

(22) PCT Filed: Aug. 5, 2022

(86) PCT No.: PCT/EP2022/072113
§ 371 (c)(1),
(2) Date: Feb. 11, 2024

(87) PCT Pub. No.: WO2023/025570
PCT Pub. Date: Mar. 2, 2023

(65) Prior Publication Data
US 2024/0296573 A1  Sep. 5, 2024

(30) Foreign Application Priority Data
Aug. 25, 2021 (DE) .................. 10 2021 209 325.6

(51) Int. Cl.
*H04N 7/18* (2006.01)
*G06T 7/30* (2017.01)
*H04N 23/695* (2023.01)

(52) U.S. Cl.
CPC ............... *G06T 7/30* (2017.01); *H04N 7/18* (2013.01); *H04N 23/695* (2023.01); *G06T 2207/10016* (2013.01)

(58) Field of Classification Search
CPC ... G06T 2207/10016; G06T 7/30; G06T 7/37; G06T 2207/10021; H04N 23/695; H04N 7/18; H04N 7/185
(Continued)

(56) References Cited

U.S. PATENT DOCUMENTS

2018/0137639 A1* 5/2018 Zou .................. G06T 7/593

FOREIGN PATENT DOCUMENTS

CN  106530230 A  3/2017

OTHER PUBLICATIONS

PCT International Search Report and Written Opinion of International Searching Authority mailed Dec. 15, 2022 corresponding to PCT International Application No. PCT/EP2022/072113 filed Aug. 5, 2022.
(Continued)

*Primary Examiner* — Sherrie Hsia
(74) *Attorney, Agent, or Firm* — Wolter Van Dyke Davis, PLLC

(57) ABSTRACT

A method for monitoring the state of a component, includes: creating a video showing a region of the component and assembling a specified number n of captured frames of the video by (a) parameterising the individual transformations by one vector per frame, which vector defines the relevant Euclidean transformation, and forming a matrix P which includes the individual transformation parameters in the sequence of the frames; (b) constructing a graph which represents a specified energy function E which is dependent on the intensity data G which include the intensities of the individual images, and on the matrix P of the transformation parameters; (c) minimising the specified energy function by the constructed graph, in order to determine the optimal matrix P of the transformation parameters; and (d) orienting the frames in a global coordinate system by Euclidean
(Continued)

transformations and the previously determined optimal matrix P of the transformation parameters.

17 Claims, 1 Drawing Sheet

(58) Field of Classification Search
USPC .......................................... 348/125; 382/295
See application file for complete search history.

(56) References Cited

OTHER PUBLICATIONS

S. Pravenaa et al, "A Methodical Review on Image Stitching and Video Stitching Techniques", International Journal Of Applied Engineering Research, vol. 11, No. 5, Jan. 1, 2016 (Jan. 1, 2016), p. 3442-3448, XP055882508.

Kostrykin Leonid et al., "Globally Optimal and Scalable Video Image Stitching for Robotic Visual Inspection of Electric Generators," 2021 21st International Conference On Control, Automation And Systems (ICCAS), ICROS, 12. Oct. 2021 (Oct. 12, 2021), pp. 1141-1145, XP034060645; DOI: 10.23919/ICCAS52745.2021.9649973.

Richard Szeliski, "Image Alignment and Stitching: A Tutorial", Foundations And Trends In Computer Graphics And Vision, vol. 2, No. 1, Jan. 1, 2006 (Jan. 1, 2006), p. 1-104, XP055227909; DOI: 10.1561/0600000009; ISSN:1572-2740.

Hasler, David et al: "Mapping Colour in Image Stitching Applications"; Journal of Visual Communication and Image Representation; Year: 2004, vol. 15, No. 1, pp. 65-90.

Koschan, Andreas et al: "SAFER Under Vehicle Inspection Through Video Mosaic Building"; Industrial Robot: An International Journal; pp. 435-442, Year: 2004.

Heung-Yeung Shum et al, "Systems and Experiment Paper: Construction of Panoramic Image Mosaics with Global and Local Alignment", International Journal Of Computer Vision, Kluwer Academic Publishers, BO, vol. 36, No. 2, Feb. 1, 2000 (Feb. 1, 2000), pp. 101-130; XP019216353; DOI: 10.1023/A:1008195814169; ISSN:1573-1405.

Appleton, Ben et al: "Towards Optimal Image Stitching For Virtual Microscopy"; In: Digital Image Computing: Techniques and Applications (DICTA'05). IEEE; Year: 2005, pp. 1-8.

\* cited by examiner

METHOD AND DEVICE FOR MONITORING THE STATE OF A COMPONENT

CROSS REFERENCE TO RELATED APPLICATIONS

This application is the US National Stage of International Application No. PCT/EP2022/072113 filed 5 Aug. 2022, and claims the benefit thereof, which is incorporated by reference herein in its entirety. The International Application claims the benefit of German Application No. DE 10 2021 209 325.6 filed 25 Aug. 2021.

FIELD OF INVENTION

The present invention relates to a method and a device for monitoring the state of a component. The invention also relates to computer-implemented methods, a computer program product, a computer-readable data carrier, and a data carrier signal.

BACKGROUND OF INVENTION

Regular visual inspections are required to ensure the functionality and maintenance of machines, in particular electrical generators. This includes the inspection of components or surfaces that may be difficult to access. In particular, components that are cooled as part of their intended use and have cooling holes for this purpose, must be checked regularly with regard to the functionality of the cooling holes. The visual inspections described are usually performed manually, but this is very time-consuming, expensive and is a monotonous task for the person performing the inspection.

Efforts have therefore been made to carry out this process automatically and to do so by regularly creating videos using a dynamically moving small robot. However, the field of view is usually relatively small in such cases. In the case of a rotor, only a small region of the component can be captured in one image. This makes the evaluation of the video recordings more difficult. To speed up and simplify the inspection, a composite image of the entire region of the component to be inspected, for example, an entire rotor wedge to be inspected, can be generated from the created video and a panoramic view can be obtained in this way. This can be achieved by methods for image composition, which comprise two steps, namely the image adjustment of the frames in a first step and the image mixing or image fusion of frames of the video into a single large-format composite image in a second step.

In connection with the image adjustment, the challenge is to find optimal geometric transformations of the individual frames into a global coordinate system. In particular in applications where the component has no specific structure and there are strong image artifacts present, including reflections and inhomogeneous illumination, this is a major challenge. In particular, mirror reflections and optical artifacts lead to incorrect intensity and motion information, which makes it more difficult to adjust representative frames and evaluate them.

SUMMARY OF INVENTION

Against this background, an object of the present invention is to provide an advantageous method for monitoring, in particular visually, the state of a component. Other objects include providing an advantageous device for monitoring the state of a component, a computer-implemented method, a computer program product, a computer-readable data carrier, and a data carrier signal. These objects are achieved by a method for monitoring the state of a component, a device for monitoring the state of a component, a computer-implemented method, a computer program product, a computer-readable data carrier, and a data carrier signal. The dependent claims contain further advantageous embodiments of the invention.

The method according to the invention for monitoring, in particular visually monitoring, the state, in particular the mechanical state of a component, in particular the component of a machine, comprises the following steps: in a first step a video is created, i.e. a sequence of sequentially acquired frames, in which a region to be monitored, such as a surface region, of the component is shown. In a second step, a fixed number n of successively acquired frames of the video is assembled to form an overall image that represents a defined region, for example of the surface of the component. In other words, a single, overall image is generated from a plurality of individual frames by assembling the frames. The overall image generated can preferably be evaluated with regard to defects or the state of the component, i.e. it images these properties in an appropriate quality.

The assembly of the frames comprises the following steps: in step (a), the individual coordinate transformations $u_k: \mathbb{R}^2 \to \mathbb{R}^2$ of a frame k are parameterized into the coordinate system of the frame k−1 by means of a vector $p_k$ per frame, i.e. $u_k = u(p_k)$, where the vector $p_k$ is the respective Euclidean transformation $u(p_k)$ (also referred to as rigid transformations) and $u_1$ is the identity transformation. Furthermore, a matrix P is formed, which comprises the individual transformation parameters, preferably in the specified sequence of the frames, for example in the form $P = [p_1 \ldots p_n]$.

In step (b), a graph is constructed representing a defined function E(G,P), which is referred to as an energy function in the context of the present invention. The energy function depends on the intensity data G and the matrix P of the transformation parameters. The intensity data G comprises the image intensities of the frames, preferably in the specified sequence of the frames. For example, let $g_k: \mathbb{R}^2 \to \mathbb{R}$ be the function of the image intensities of the frame k. For a video of n frames, $G = [g_1 \ldots g_n]$ then represents the intensity data of the overall video and $P = [p_1 \ldots p_n]$ represents all transformation parameters.

In step (c), the energy function E(G,P) is minimized and the optimum matrix P is determined. A fixed number of frames n of the video is evaluated simultaneously.

In step (d), the frames are aligned by means of the determined matrix P in a global or common coordinate system or transformed into one by means of Euclidean transformations, in other words, a transformation of local coordinates of the respective frames into a global coordinate system is carried out. For example, let $u_k: \mathbb{R}^2 \to \mathbb{R}^2$ be the coordinate transformation of a frame k. Then $\tilde{u}_k = u_1 \circ \ldots \circ u_k$ is the transformation of the frame k into a global coordinate system.

In an optional third step, the assembled overall image that is generated can be evaluated with regard to possible defects of the component. This can be carried out manually or using suitable image recognition software.

The described method has the advantage that it allows the generation of very high-quality assembled overall images, i.e. panoramic views, of a component to be examined, which enables a reliable inspection of regions of a component to be scanned, in particular, those that are hard-to-access or very time-consuming to achieve by manual inspection, by means of video recordings. The transformation of frames of a video into a panoramic image or into a single overall image is not possible with the previously known methods in the quality achievable with the present invention. By means of the present invention, components can therefore be inspected for possible defects quickly, cost-effectively and reliably by means of, for example, automatically created video scans.

Advantageously, the video is acquired by means of a device, for example a robot, which comprises a camera. In this way, appropriate video material can be created automatically. For example, a plurality of corresponding devices can be used for scanning different regions of a component simultaneously. In this way, a machine or a specific component can be inspected in a very short time. Preferably, the camera is moved along the component by means of the said device, for example by means of the robot, during the acquisition of the video and frames are dynamically acquired or frames are statically acquired at different positions of the component. This preferably takes place automatically. In addition or alternatively, it is obviously also possible to capture the video manually.

The Euclidean transformation may include translation and/or rotation.

The energy function preferably comprises a data term D(G,P), which is dependent on the intensity data G, which comprises the image intensities, and on the matrix P of the transformation parameters. The data term quantifies the similarity of the intensities of consecutive frames as a function of the transformation parameters. This allows the different frames to be matched to each other using the intensities.

The energy function can include at least one regularization term which represents or characterizes at least one physical feature of the movement of the robot guiding the camera. The regularization term can include a sum of a binary regularization term and/or a unary regularization term. By means of the regularization term, the characteristics of the movement of a robot or a corresponding device guiding the camera can be taken into account.

In a preferred variant, the energy function E(G,P) is defined according to the following formula:

$$E(G, P) = D(G, P) + \sum_{k=2}^{n} \lambda \cdot S(p_{k-1}, p_k) + \mu \cdot P(p_k) \quad (1)$$

For a video of n frames, $G=[g_1 \ldots g_n]$ represents the intensities of the image data of the overall video and $P=[p_1 \ldots p_n]$ all transformation parameters. Each column $p_k$ of the matrix P is a vector that parameterizes the Euclidean transformation $u(p_k)$. D is a data term, S is a binary regularization term, P is a unary regularization term, and $\lambda, \mu \geq 0$ are regularization parameters.

The data term D quantifies the intensity similarities of consecutive frames by $$D(G, P) + \sum_{k=2}^{n} f(g_{k-1}, g_k \circ u_k) \quad (2)$$

with $$u_k = u(p_k)$$

and $$f(g, h) = \max\{0; 1 - NCC(g, h)\} \quad (3)$$

NCC(g,h) is the normalized cross-correlation of g and h. For example, the weighted mean of g and h based on a Gaussian function can be used to focus on the local image information and to handle inhomogeneous exposures.

The regularization terms S and P take into account physical characteristics of the movement of the robot during the image acquisition. For example, because the robot forms an inert mass, its movement cannot change abruptly. As the video is created at a substantially constant frame rate, the corresponding transformations should therefore not change abruptly either. For this reason, a binary regularization term S is introduced, which prefers gentle transitions between successive transformations. Since the movements of the robot are normally in a straight line, the expression $$S(p_{k-1}, p_k) = (v_k - v_{k-1})^2 \quad (4)$$

can be used, where $v_k$ is the vertical translation.

Since the robot is typically in motion and very small translations are unlikely, a unary regularization term P in the form $$P(p_k) = \exp(-\kappa \cdot v_k^2) \quad (5)$$

can be used. The parameter $\kappa > 0$ controls the limit for which translations are considered too small and are therefore less preferred. The minimization of the energy function according to formula (1) determines the global solution for the parameters
$\hat{P}$ Using all the frames of the video.

The global minimization of the energy function can be performed using a graph-based method for searching for the shortest path. In particular, a local optimality condition for the data term D can be introduced $$\nabla D(G, P) = 0 \quad (6)$$
$$\nabla^2 D(G, P) > 0$$

which results in a minimization problem with a constraint. The solution can be determined using a three-step scheme described below.

Based on the fact that the calculation of image rotations and translations is separable, the relative rotation between consecutive frames is determined by calculating the logarithmic amplitude spectra in a Fourier representation of all the images. Such spectra are translation invariant. Therefore, the phase correlation of the logarithmic amplitude spectra in polar coordinates results in the rotation matrix $R_k \in \mathbb{R}^{2\times 2}$ for each frame $k \geq 2$ with respect to the frame k−1. This induces the rotation $r_k(x) = R_k x$, where $x \in \mathbb{R}^2$ is a pixel of the frame k.

In the second stage, a graph-based formulation of the minimization of equation 1 with the constraint according to equation 6 is used. All pairs of frames $(g_k-1, g_k \circ r_k)$ for $k \geq 2$ are considered and the phase correlation matrix $M_k$ is calculated. Each local maximum of $M_k$ corresponds to a translation of the image $g_k \circ r_k$, which results in a local maximum NCC term and thus satisfies equation 6. The translation vectors $v_k = \{v_1^{(k)}, \ldots, v_{m_k}^{(k)}\}$ that correspond to the $m_k$ maximum values of each row of the matrix $M_k$ are now considered. These are assigned to the nodes of the graph.

The edges $v_{i-1} \times v_i$ are added and each edge $(v_l^{(i-1)}, v_k^{(i)})$ is weighted by means of the sum $f(g_{k-1}, g_k \circ u_k)$ and the regularization terms S and P using the transformations induced by rotations $R_k$ and translations $v_l^{(i-1)}$ and $v_k^{(i)}$. Then the node $v_0 = \{0\}$ is added to the graph. Using the rotation matrices $R_2 \ldots R_n$, which were determined in the first step or the first stage, each path $\pi = (v_1, \ldots, v_n)$ generates the transformation parameters $$P^T = [0 \ \pi][I \ R_2^T \ \ldots \ R_n^T], \quad (7)$$

where $P^T$ denotes the transposed matrix of P, 0 is the zero vector and I is the unit matrix, so that equation 1 is equal to the sum of the weights along the path $\pi$. Therefore, determining the shortest path $\hat{\pi} \in \Pi$ is equivalent to the global minimization of equation 1, assuming the rotations $R_2 \ldots R_n$ and the local optimality condition according to equation 6.

The shortest path $\hat{\pi} \in \Pi$ can be calculated using the Dijkstra algorithm, which is globally optimal, and $\hat{P}$ can be determined according to equation 7. This will find the best of all permissible solutions. Graph G has $\mathcal{O}(m \cdot n)$ nodes and $\mathcal{O}(m^2 \cdot n)$ edges, where m is the image height in pixels and n is the number of frames. The image width is equal to the number of columns of the matrix $M_k$ and therefore has a linear effect on the runtime of the computation of the nodes $v_k$, but does not affect the structure of the graph. The shortest path is calculated in $\mathcal{O}(m^2 \cdot n)$ time on the basis of the structure of G, which is linear with respect to the number of frames n. Since all the three steps or three stages of the scheme presented above are performed in linear time, the total runtime is also linear with respect to the number of frames.

In particular, the described method avoids the accumulation of translation errors, which is a fundamental problem in methods that adjust and assemble frames in pairs.

The image adjustment method described delivers the global transformations $\tilde{u}_1, \ldots, \tilde{u}_n$ for all frames of a video. A non-linear image mixing method with prior radiometric correction of the frames can be used to generate an assembled overall image by local normalization of the image intensity distribution. Let $G_k^{rgb}$ be the intensity values of the frame k in the RGB color space (red, green, blue). The RGB value of each pixel $x \in \mathbb{R}^2$ of the assembled overall image can then be calculated as a weighted average of the transformed images $G_k^{rgb} \circ \tilde{u}_k$, for which $\tilde{u}_k(x)$ is within the definition range of $G_k^{rgb}$.

Using the assembled image generated in this way, in the example of cooling holes of a generator component to be examined, potentially defective cooling holes or other defects of the component can be detected. This may be carried out, for example, by means of supervised machine learning. For this purpose, the cooling holes can be detected and potential defects in the cooling holes or other defects can be identified.

To assemble the frames, a non-linear image mixing method can be used and/or a radiometric correction of the individual frames can be carried out by local normalization of the image intensity distribution.

The device according to the invention for monitoring, preferably for visually monitoring the state, in particular the mechanical state of a component, in particular a component of a machine, comprises a camera and an evaluation device. The device is designed to carry out a previously described method according to the invention. The device according to the invention has the above-mentioned features and advantages of the method according to the invention already described. The component can be a component of an electrical machine, for example, a component of a motor and/or a generator. The component can comprise a number of cooling holes. The component may be, for example, a rotor, in particular a rotor wedge, and/or a stator, in particular stator teeth.

The computer-implemented method comprises commands, which during the execution of the program by a computer cause said computer to carry out the steps (a) to (d) of a method according to the invention described above, or execute a method according to the invention described above. The computer program product comprises commands, which during the execution of the program by a computer cause said computer to carry out the steps (a) to (d) of a method according to the invention described above, or execute a method according to the invention described above. On the computer-readable data carrier according to the invention, a computer program according to the invention is stored. The data carrier signal according to the invention transmits a computer program product according to the invention. The computer-implemented method according to the invention, the computer program product according to the invention, the computer-readable data carrier according to the invention, and the data carrier signal according to the invention have the features and advantages already mentioned in connection with the method according to the invention.

The invention is described hereafter in greater detail on the basis of exemplary embodiments and by reference to the attached figures. Although the invention is illustrated and described in greater detail by means of the preferred exemplary embodiments, the invention is not restricted by the examples disclosed and other variations can be derived therefrom by a person skilled in the art without departing from the scope of protection of the invention.

The figures are not necessarily accurate in every detail or true to scale and can be shown enlarged or reduced in order to provide a better overview. Therefore, functional details disclosed here are not to be understood in a restrictive sense, but merely as a descriptive basis which offers guidance to the person skilled in the art in this field of technology for applying the present invention in a variety of ways.

As used herein, the term "and/or", when used in a series of two or more elements, means that each of the items listed can either be used alone, or else any combination of two or more of the listed elements can be used. For example, if a combination is described which contains the components A, B and/or C, the combination can contain A alone; B alone; C alone; A and B in combination; A and C in combination; B and C in combination; or A, B, and C in combination.

DETAILED DESCRIPTION OF INVENTION

Figure 1:
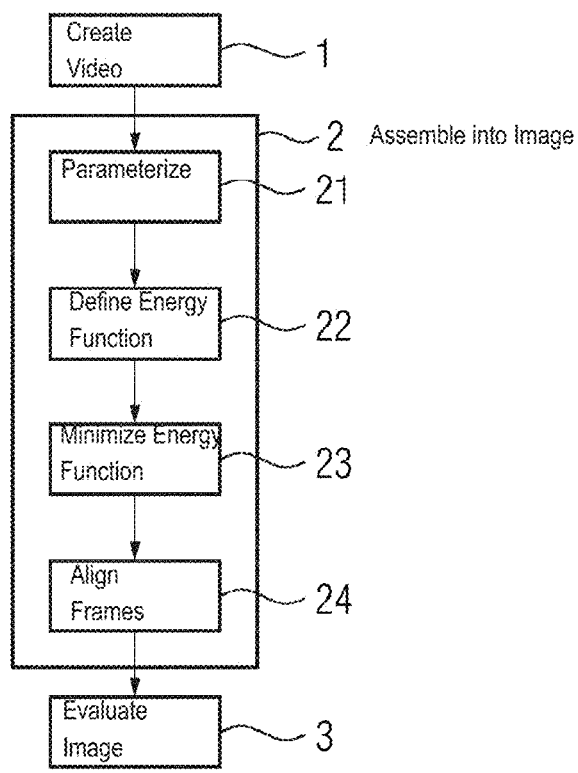
FIG. 1 shows a schematic drawing of a variant embodiment of a method according to the invention in the form of a flowchart.

FIG. 1 shows a schematic drawing of a variant embodiment of a method according to the invention in the form of a flowchart. In the context of the method for visually monitoring the mechanical state of a component of a machine, in a step 1 a camera is used to create a video, in which a region to be monitored, for example a surface, of the component is shown. In a second step 2, a fixed number n of consecutively acquired frames of the video is assembled to form an overall image, which represents a defined region, for example the surface of the component. In an optional third step 3, the overall image is evaluated with regard to possible defects of the component.

The creation of the video in step 1 is preferably carried out by means of a robot comprising a camera. The camera is preferably moved along the component in the process.

During step 2, i.e. the assembly of the frames into an overall image, a subroutine consisting of four substeps is performed. In a first step 21, the individual transformations are parameterized by means of one parameter vector $p_k$ per frame, which defines the respective Euclidean transformations. From the parameters $p_k$ of the transformation $u(p_k)$, a matrix P is formed which comprises the individual transformation parameters in the sequence of the frames, wherein the frames have a fixed sequence. In a next step 22, a graph is constructed which represents a defined energy function dependent on the intensity data G and the matrix P of the transformation parameters. This can be carried out using the formulas (1) to (7) given above. In a next step 23, the energy function represented by the graph is minimized with respect to the matrix P, i.e. a fixed number of frames of the video is adjusted simultaneously. This determines the optimum matrix P of the transformation parameters. In step 24, the frames are aligned in a global (i.e. common) coordinate system using Euclidean transformations and the previously determined optimal transformation parameters, or transformed into such a system.

Figure 2:
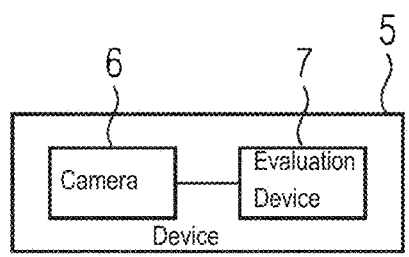
FIG. 2 shows a schematic view of a device according to the invention for monitoring the state of a component.

FIG. 2 shows a schematic view of a device according to the invention for monitoring the state of a component. The device 5 comprises a camera 6 and an evaluation device 7. The evaluation device 7 is designed to process videos acquired by means of the camera 6 in accordance with the method according to the invention, that is, to assemble a fixed number of captured frames of the video to form an overall image. The device according to the invention is designed overall to implement a method described above, for example to carry out a method described using FIG. 1.

The invention claimed is:

1. A method for monitoring a state of a mechanical component, comprising:
creating a video in which a region of the component that is to be monitored is shown;
assembling a specified number of captured frames of the video to form an overall image which images a specified region of the component;
wherein the assembling comprises:
(a) parameterizing individual transformations by one vector per frame in each case, which vector defines a respective Euclidean transformation, and forming a matrix P which comprises the individual transformation parameters in a sequence of the frames, the frames having a specified sequence;
(b) defining a specified energy function E (G,P) which is dependent on intensity data G, which comprises intensities of the frames, and on the matrix P of the transformation parameters,
(c) minimizing the energy function E (G,P), which determines an optimum matrix P, by simultaneously evaluating the specified number of captured frames of the video,
(d) aligning the frames in a global coordinate system using Euclidean transformations and the previously determined optimal transformation parameters.

2. The method as claimed in claim 1,
wherein the creation of the video is carried out by a device comprising a camera.

3. The method as claimed in claim 2,
wherein, as the camera is moved along the component by the device during the creation, frames are dynamically acquired or frames are statically acquired at different positions of the component.

4. The method as claimed in claim 1,
wherein the Euclidean transformation includes translation and/or rotation.

5. The method as claimed in claim 1,
wherein the energy function E (G,P) includes a data term D (G,P), which quantifies a similarity of the intensities of successive frames and which is dependent on the intensity data vector G of the image intensities and on the matrix P of the transformation parameters.

6. The method as claimed in claim 1,
wherein the energy function E (G,P) includes at least one regularization term, which takes into account at least one physical feature of a movement of a robot during an image acquisition.

7. The method as claimed in claim 6,
wherein the regularization term consists of a sum of a binary regularization term and/or a unary regularization term.

8. The method as claimed in claim 1,
wherein the energy function E (G,P) is defined in accordance with $$E(G,P) = D(G,P) + \sum_{k=2}^{n} \lambda \cdot S(p_{k-1}, p_k) + \mu \cdot P(p_k)$$

where n denotes the specified number of captured frames, $G=[g_1 \ldots g_n]$ denotes the intensities of the image data of the entire video and $P=[p_1 \ldots p_n]$ denote all transformation parameters, where $p_k$ is a vector that parameterizes the Euclidean transformation $u(p_k)$, D is a data term, S is a binary regularization term, P is a unary regularization term and $\lambda, \mu \geq 0$ are regularization parameters.

9. The method as claimed in claim 8,
wherein a data term D is formed according to the formula $$D(G,P) + \sum_{k=2}^{n} f(g_{k-1}, g_k \circ u_k)$$

where $g_k$ denotes the function of the image intensities of the frame k, $u_k = u(p_k)$ and $f(g,h) = \max\{0; 1-NCC(g,h)\}$, where $NCC(g,h)$ is the normalized cross-correlation of g and h, and/or a regularization term S according to the formula $S(p_{k-1}, p_k) = (v_k - v_{k-1})^2$ is used, where $v_k$ denotes the vertical translation, and/or a regularization term P according to the formula $P(p_k) = \exp(-\kappa \cdot v_k^2)$ is used with $\kappa > 0$.

10. The method as claimed in claim 1,
wherein the energy function E (G,P) is minimized using a graph-based method for searching for the shortest path.

11. The method as claimed in claim 1,
wherein a non-linear image mixing method is used to assemble the frames and/or a radiometric correction of the individual frames is performed by locally normalizing the image intensity distribution.

12. A device for monitoring a state of a mechanical component, comprising:
    a camera, and
    an evaluation device,
    wherein the device for monitoring is designed to carry out a method as claimed in claim 1.

13. The device as claimed in claim 12,
wherein the component is a component of an electrical machine.

14. The device as claimed in claim 13,
wherein the component is a component of a motor and/or a generator.

15. A computer-implemented method, comprising:
    assembling a specified number of captured frames of a video in which a region of a mechanical component that is to be monitored is shown to form an overall image which images a specified region of the component;
    wherein the assembling comprises:
    (a) parameterizing individual transformations by one vector per frame in each case, which vector defines a respective Euclidean transformation, and forming a matrix P which comprises the individual transformation parameters in a sequence of the frames, the frames having a specified sequence;
    (b) defining a specified energy function E (G,P) which is dependent on intensity data G, which comprises intensities of the frames, and on the matrix P of the transformation parameters,
    (c) minimizing the energy function E (G,P), which determines an optimum matrix P, by simultaneously evaluating the specified number of frames of the video,
    (d) aligning the frames in a global coordinate system using Euclidean transformations and the previously determined optimal transformation parameters.

16. A computer program product stored on a non-transitory computer readable medium, comprising:
    commands stored thereon which during the execution of the program by a computer cause said computer to carry out the method as claimed in claim 15.

17. A non-transitory computer-readable medium on which the computer program product as claimed in claim 16 is stored.

* * * * *